US012748558B2

(12) United States Patent
Wang et al.

(10) Patent No.: US 12,748,558 B2
(45) Date of Patent: Sep. 29, 2026

(54) CONTAINER DATA SHARING VIA EXTERNAL MEMORY DEVICE

(71) Applicant: International Business Machines Corporation, Armonk, NY (US)

(72) Inventors: Hui Wang, Beijing (CN); Yue Wang, Beijing (CN); Mai Zeng, Beijing (CN); Wei Li, Beijing (CN); Yu Mei Dai, Beijing (CN); Xiao Chen Huang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 17/823,979

(22) Filed: Sep. 1, 2022

(65) Prior Publication Data

US 2024/0078050 A1 Mar. 7, 2024

(51) Int. Cl.
*G06F 9/46* (2006.01)
*G06F 3/06* (2006.01)
*G06F 9/50* (2006.01)

(52) U.S. Cl.
CPC .......... *G06F 3/0665* (2013.01); *G06F 3/0614* (2013.01); *G06F 3/067* (2013.01); *G06F 9/5077* (2013.01); *G06F 2209/505* (2013.01)

(58) Field of Classification Search
CPC ...... G06F 3/0665; G06F 3/0614; G06F 3/067; G06F 9/5077; G06F 2209/505; G06F 11/1438; G06F 11/1658; G06F 11/1484; G06F 11/2028; G06F 11/2097; G06F 11/203; G06F 11/2043
See application file for complete search history.

(56) References Cited

U.S. PATENT DOCUMENTS

| | | | |
|---|---|---|---|
| 5,860,115 A | 1/1999 | Neuhard et al. | |
| 6,594,667 B2 | 7/2003 | Dahlen et al. | |
| 6,963,994 B2 | 11/2005 | Allen et al. | |
| 7,003,693 B2 | 2/2006 | Allen et al. | |
| 7,743,036 B2 | 6/2010 | Cotner et al. | |
| 9,253,046 B2 | 2/2016 | Elko et al. | |
| 9,317,209 B2 | 4/2016 | Kirshenbaum et al. | |
| 10,922,090 B1 * | 2/2021 | Lieberman | G06F 9/455 |

(Continued)

FOREIGN PATENT DOCUMENTS

| | | | |
|---|---|---|---|
| CN | 119790382 A | 4/2025 | |
| EP | 4581489 A1 | 7/2025 | |
| WO | 2024/047509 A1 | 3/2024 | |

OTHER PUBLICATIONS

PCT International Search Report and Written Opinion, dated Oct. 31, 2023, regarding Application No. PCT/IB2023/058490, 14 pages.

(Continued)

*Primary Examiner* — Mehran Kamran
(74) *Attorney, Agent, or Firm* — Yee & Associates, P.C.

(57) ABSTRACT

Container data sharing is provided. A second container of a cluster of containers is started to process a service request in response to detecting a failure of a first container processing the service request. The service request and data generated by the first container that failed stored on a physical external memory device is accessed. The service request and the data generated by the first container that failed is loaded on the second container from the physical external memory device via a dedicated hardware link for high-speed container failure recovery.

17 Claims, 9 Drawing Sheets

(56) References Cited

U.S. PATENT DOCUMENTS

| | | | | |
|---|---|---|---|---|
| 11,157,309 | B2 | 10/2021 | Wang et al. | |
| 2007/0239947 | A1* | 10/2007 | Li | H04L 9/0643 711/154 |
| 2013/0031403 | A1* | 1/2013 | Mordani | G06F 11/2041 714/E11.073 |
| 2013/0138863 | A1* | 5/2013 | Tsirkin | G06F 12/0284 711/6 |
| 2014/0149985 | A1* | 5/2014 | Takeuchi | G06F 9/4555 718/1 |
| 2016/0164753 | A1* | 6/2016 | Cimprich | G06F 9/5072 709/222 |
| 2016/0274814 | A1* | 9/2016 | Zhang | G06F 3/0664 |
| 2017/0116055 | A1 | 4/2017 | Harran et al. | |
| 2017/0300394 | A1 | 10/2017 | Raut | |
| 2017/0308330 | A1* | 10/2017 | Suresh | G06F 3/0689 |
| 2018/0129570 | A1* | 5/2018 | Sirota | G06F 9/4806 |
| 2019/0347121 | A1* | 11/2019 | Luo | G06F 9/542 |
| 2020/0117478 | A1* | 4/2020 | Li | G06F 9/455 |
| 2020/0274800 | A1 | 8/2020 | Stevens et al. | |
| 2021/0036925 | A1 | 2/2021 | Boddam | |
| 2021/0279151 | A1* | 9/2021 | Sarkar | G06F 11/1469 |
| 2022/0004468 | A1 | 1/2022 | Willhalm et al. | |

OTHER PUBLICATIONS

Mcdavitt et al., "System for Supporting a Container-Based Application on a Storage System," An IP.com Prior Art Database Technical Disclosure, IPCOM000257716D, Mar. 5, 2019, 4 pages.

* cited by examiner

CONTAINER DATA SHARING VIA EXTERNAL MEMORY DEVICE

BACKGROUND

1. Field

The disclosure relates generally to containers and more specifically to enabling containers running on operating systems having container extensions to utilize physical external memory devices for container data sharing and high-speed container failure recovery via dedicated hardware links.

2. Description of the Related Art

A container is the lowest level of a service (e.g., a micro-service), which holds the running application, libraries, and their dependencies. Containers can be exposed using an external IP address. Containers are typically used in various cloud environments and bare metal data centers. Currently, when a service request is being handled by a particular container in a cluster of containers and that particular container encounters an issue that causes the container to crash or fail, the service request is interrupted and the client device requesting the service receives a timeout response after a defined period of time. Consequently, after receiving the timeout response, the client device has to resend the service request via a standard network in order for another container in the cluster to handle the service request causing further delay and increased network traffic. However, no solution currently exists to enable containers to exploit physical external memory devices to achieve data sharing between containers for high-speed container failure recovery via dedicated hardware links.

SUMMARY

According to one illustrative embodiment, a computer-implemented method for container data sharing is provided. A second container of a cluster of containers is started to process a service request in response to detecting a failure of a first container processing the service request. The service request and data generated by the first container that failed stored on a physical external memory device is accessed. The service request and the data generated by the first container that failed is loaded on the second container from the physical external memory device via a dedicated hardware link for high-speed container failure recovery. According to other illustrative embodiments, a computer system and computer program product for container data sharing are provided. As a result, the illustrative embodiments enable containers to utilize physical external memory devices, which communicate via dedicated hardware links, to achieve high data availability for high-speed container failure recovery as compared to traditional distributed solutions that communicate via standard networks.

DETAILED DESCRIPTION

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
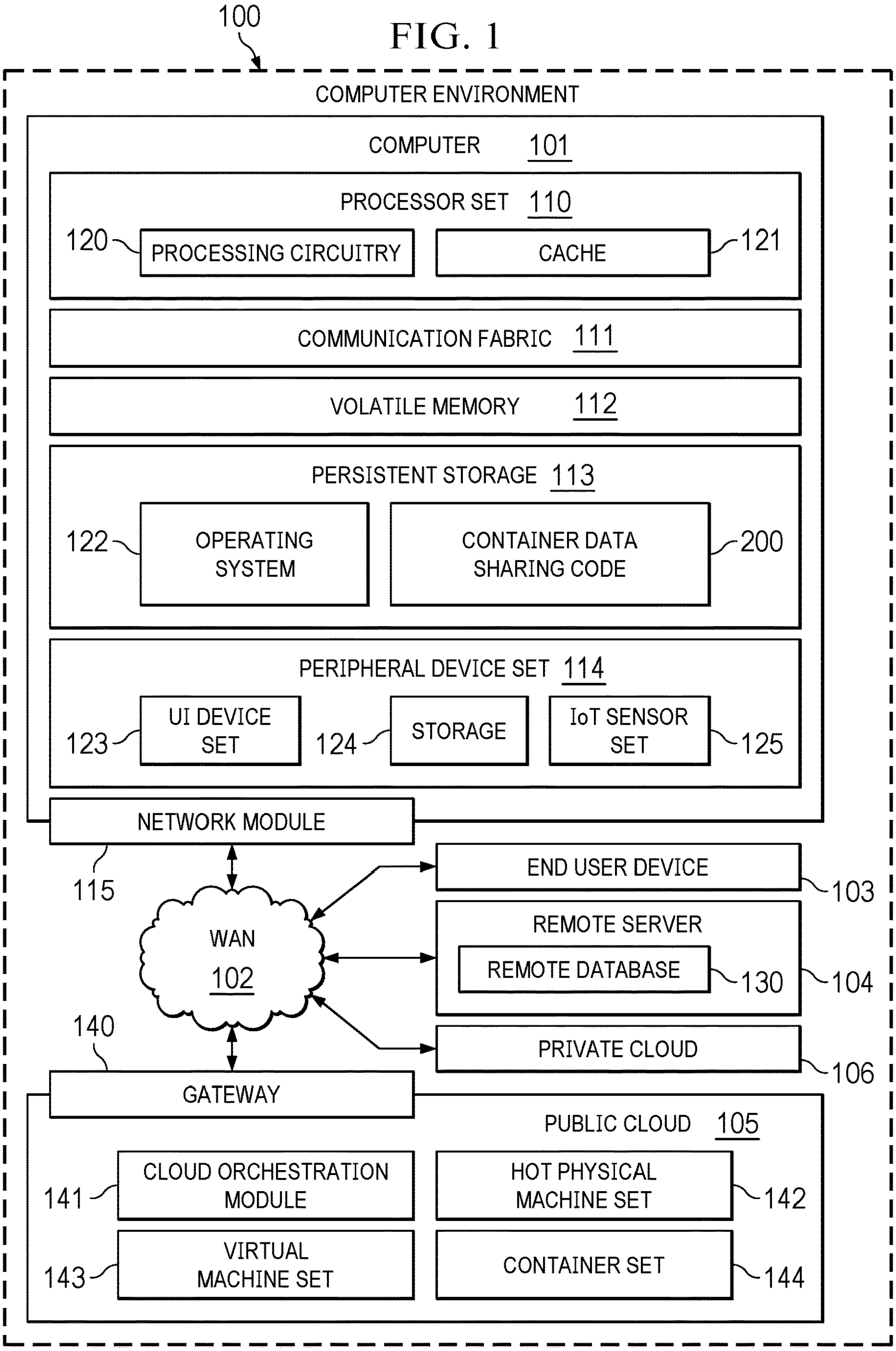
FIG. 1 is a pictorial representation of a computing environment in which illustrative embodiments may be implemented.
Figure 2:
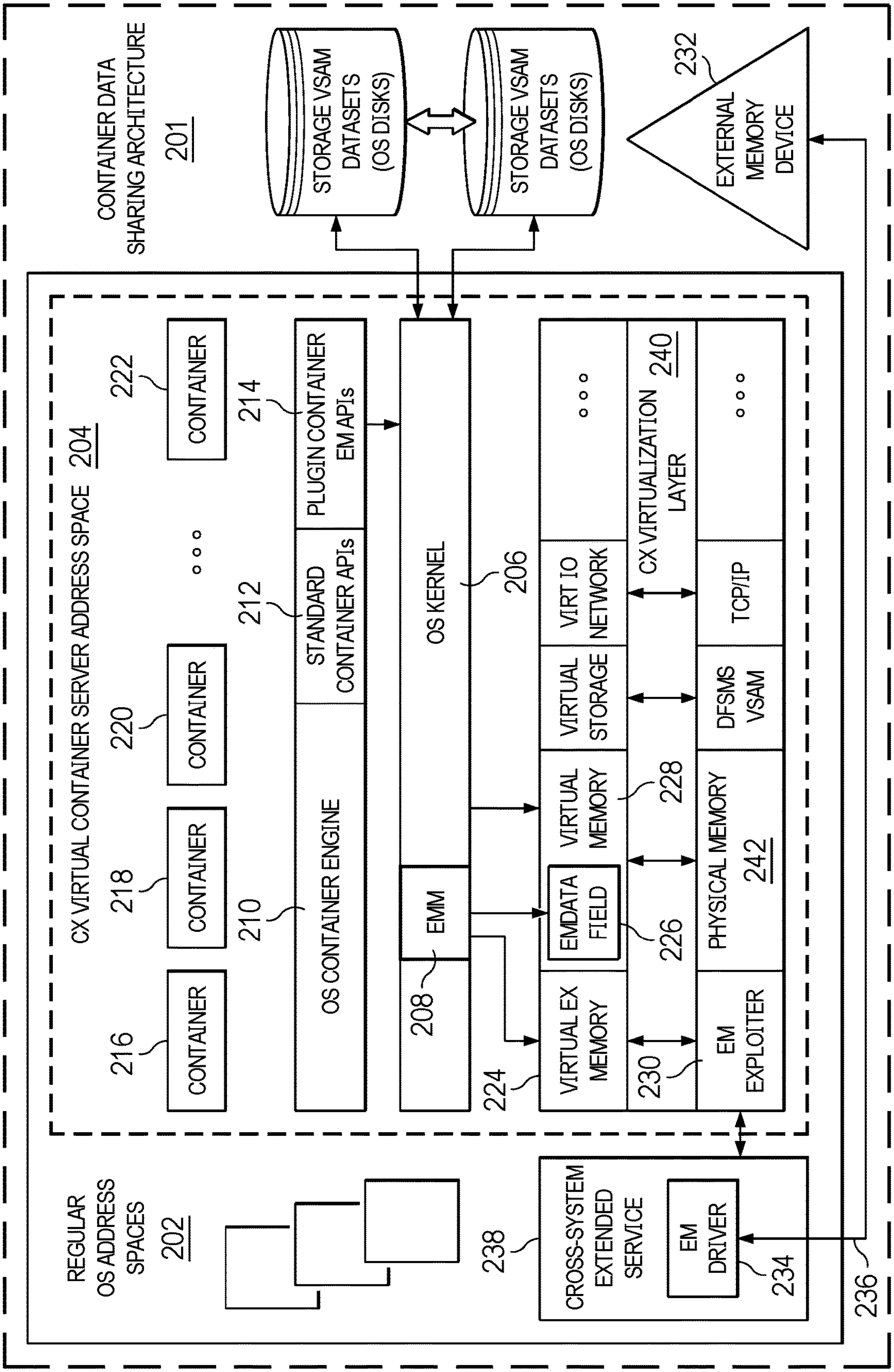
FIG. 2 is a diagram illustrating an example of a container data sharing architecture in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as container data sharing code 200. Container data sharing code 200 enables containers running on operating systems having container extensions to utilize physical external memory devices for container data sharing to achieve high-speed container failure recovery via dedicated hardware links. In addition to container data sharing code block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and container data sharing code block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Containers can run on operating systems that can utilize a physical external memory device, such as, for example, a coupling facility. A coupling facility is a mainframe processor that runs in its own logical partition (LPAR), which is defined via a hardware management console, that includes a dedicated physical central processor, memory, specialized hardware communication channels (e.g., physical coupling facility links) dedicated for data transfer between shared data queues of containers, and a specialized operating system (e.g., coupling facility control code). A coupling facility has no I/O devices, other than the physical coupling facility links. The data contained in the coupling facility resides entirely in storage (e.g., memory) as the coupling facility control code is not a virtual memory operating system. Typically, a coupling facility has a large storage (e.g., of the order of tens of gigabytes). Also, the coupling facility does not run application software.

Currently, applications and middleware that run on certain operating systems (e.g., z/OS®) can take advantage of a physical external memory device for data sharing and high availability. z/OS is a registered trademark of International Business Machines, Corp., Armonk, New York, USA. Entities, such as, for example, enterprises, businesses, companies, organizations, institutions, agencies, and the like, are increasingly embracing the use of hybrid workloads. As a result, these operating systems include container extensions to enable containers to run on these operating systems and enable cloud-native workloads. However, no solution currently exists to enable these containers to use physical external memory devices to achieve data sharing and high availability.

Illustrative embodiments enable containers running on these operating systems having container extensions to utilize physical external memory devices for container data sharing and high-speed container failure recovery via dedicated hardware links. For example, illustrative embodiments provide a plugin container external memory application programming interface (API) to enable a container to call the container external memory API to perform operations, such as create, delete, clean, lock, unlock, and the like, on the physical external memory device in accordance with a service request that the container is processing. An illustrative example of a plugin container external memory API is as follows:

```
func newExMemoryDriver( ) (root, EMAddress, EMBase
    string, servers [ ]string) exmemoryDriver { }
    func (d exmemoryDriver) Create(r memory.Request)
      memory.Response { }
    func (d exmemoryDriver) Delete(r memory.Request)
      memory.Response { }
    func (d exmemoryDriver) Clean(r volume.Request)
      memory.Response { }
    func (d exmemoryDriver) Lock(r volume.Request)
      memory.Response { }
    func (d exmemoryDriver) Unlock(r volume.Request)
      memory.Response { }
. . .
```

Illustrative embodiments may generate a new external memory driver function for each respective service request received to perform the corresponding operations on that particular physical external memory device.

In addition, illustrative embodiments add an external memory manager to the kernel of the operating system. The external memory manager enables the operating system kernel to generate a dedicated field (e.g., external memory data field) in a virtual memory and copy the data contained in the external memory data field to a virtual external memory. Further, illustrative embodiments add an external memory exploiter under a container extensions virtualization layer. The container extensions virtualization layer is, for example, a partition manager, such as a hypervisor. The container extensions virtualization layer virtualizes resources of the container data sharing architecture into a plurality of LPARs. For example, each respective container corresponds to a particular LPAR of the plurality of LPARs in the container data sharing architecture. Each LPAR shares physical resources, such as processing capability, memory, storage, network devices, and the like.

Illustrative embodiments utilize the external memory exploiter to connect to a cross-system extended service component of the operating system to transfer data from the virtual external memory of the container extensions virtualization layer to a physical external memory device. The cross-system extended service component of the operating system includes a section for an external device driver program. The cross-system extended service component utilizes the external device driver program to operate the physical external memory device. The container extensions virtualization layer virtualizes shared container data stored on the physical external memory device to the virtual external memory as directed by the external memory manager.

Illustrative embodiments utilize the external memory manager to register and send data changes (e.g., write changes), which are generated in the container (e.g., writable container) to the physical external memory device. The external memory manager registers a data structure (i.e., a data storage unit, memory segment, or the like) in the physical external memory device for storing data that is to be shared between containers in response to a cluster of containers starting. In addition, in response to a new service request coming into the cluster of containers, the external memory manager stores the new service request in the external memory device. While a container in the cluster processes the new service request, the external memory manager retrieves each respective data change generated by the container and stores each of these data changes in the registered data structure of the physical external memory device in real time.

Further, in response to the container, which is processing the new service request, encountering an issue causing the container to crash or fail, the external memory manager selects another container in the cluster to take over processing of the service request. For example, the external memory manager recovers the point of processing of the crashed container in the other container by retrieving the service request, which was being processed by the crashed container, and the corresponding data changes generated by the crashed container, which are stored in the registered data structure of the external memory device. Then, the external memory manager sends the retrieved service request and corresponding data changes to the other container in the cluster using the dedicated hardware external memory device link or communication channel for high-speed container failure recovery. Further, the external memory manager synchronizes the service request and corresponding data changes stored in the external memory device with the other container taking over processing for the crashed container.

As a result, illustrative embodiments by enabling containers, which are managed by an operating system having container extensions, to utilize physical external memory devices that communicate via dedicated hardware links, illustrative embodiments allow these containers to achieve high data availability for high-speed container failure recovery as compared to traditional distributed solutions that communicate via standard networks. Thus, illustrative embodiments provide one or more technical solutions that overcome a technical problem with enabling containers to share data via physical external memory devices for high data availability to achieve high-speed container failure recovery. As a result, these one or more technical solutions provide a technical effect and practical application in the field of containers.

With reference now to FIG. 2, a diagram illustrating an example of a container data sharing architecture is depicted in accordance with an illustrative embodiment. Container data sharing architecture 201 may be implemented in a computing environment, such as computing environment 100 in FIG. 1. Container data sharing architecture 201 is a system of hardware and software components for enabling containers to share data via physical external memory devices for high data availability to achieve high-speed container failure recovery.

In this example, container data sharing architecture 201 includes regular operating system (OS) address spaces 202 and container extensions (CX) virtual container server address space 204 of an operating system, such as, for example, a z/OS. Regular operating system address spaces 202 and container extensions virtual container server address space 204 represent areas of virtual addresses available for executing instructions and storing data.

Container extensions virtual container server address space 204 includes operating system kernel 206, which contains external memory manager (EMM) 208, and operating system container engine 210. Operating system container engine 210 includes standard container APIs 212 and plugin container external memory APIs 214. Container 216, container 218, container 220, and container 222 call plugin container external memory APIs 214 to direct external memory manager 208 to generate virtual external memory 224. It should be noted that containers 216, 218, 220, and 222 are meant as an example only and not as a limitation on illustrative embodiments. In other words, container extensions virtual container server address space 204 can include any number of containers and the containers can be included in a cluster of containers. In addition, the containers can process any type and number of service requests.

In response to receiving instructions from one of plugin container external memory APIs 214, external memory manager 208 of operating system kernel 206 generates virtual external memory 224. In addition, external memory manager 208 copies data, which was generated by a container while processing a service request, in external memory data (EMDATA) field 226 of virtual memory 228 to virtual external memory 224. Further, external memory manager 208 continuously monitors for data changes in external memory data field 226 and updates virtual external memory 224 with those data changes in external memory data field 226.

Container extensions virtual container server address space 204 also includes external memory (EM) exploiter 230. External memory exploiter 230 connects to physical external memory device 232 via external memory driver 234 using dedicated hardware link 236, to store the data changes from virtual external memory 224 in physical external memory device 232 for container data sharing to achieve high-speed container failure recovery in the event of failure of a container while processing a service request. External memory driver 234 controls operations performed on physical external memory device 232.

External memory exploiter 230 generates cross-system extended service 238 in regular operating system address spaces 202 in order to connect to physical external memory device 232 through the operating system. It should be noted that cross-system extended service 238 includes external memory driver 234. When connecting to a particular physical external memory device, external memory driver 234 selects the corresponding code paragraph for the type of that particular external memory device (e.g., a coupling facility) and connects to that particular external memory device to obtain the shared data resource contained on that particular external memory device. Container extensions (CX) virtualization layer 240 virtualizes the shared data resource stored in that particular external memory device to virtual external memory 224 for container data sharing.

Also, it should be noted that physical memory 242 represents the physical memory corresponding to container extensions virtual container server address space 204. Furthermore, certain address spaces of physical memory 242 correspond to particular address spaces in virtual memory 228, especially address spaces associated with external memory data field 226. This represents data that is to be shared between containers, such as, for example, container 216 and container 218, via physical external memory device 232, in the event of failure of container 216 while processing a service request.

Figure 3:
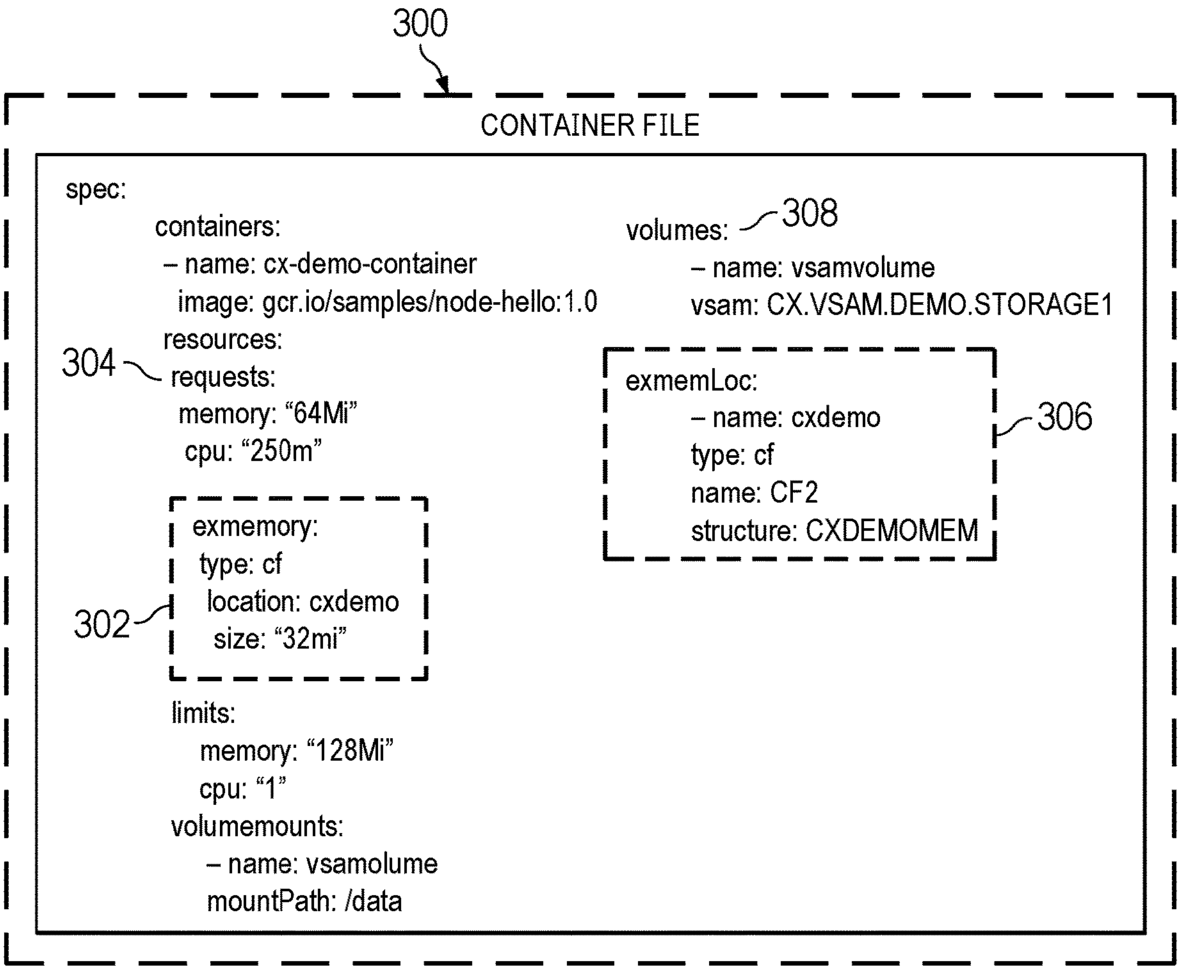
FIG. 3 is a diagram illustrating an example of a container file in accordance with an illustrative embodiment.

With reference now to FIG. 3, is a diagram illustrating an example of a container file is depicted in accordance with an illustrative embodiment. Container file 300 can be implemented in a plugin container external memory API, such as, for example, one of plugin container external memory APIs 214 in FIG. 2. Also, in this example, container file 300 is a YAML file. YAML is a human-readable data-serialization language for files where data is to be stored or transmitted. However, it should be noted that container file 300 is intended as an example only and not as a limitation on illustrative embodiments.

Container file 300 includes external memory section 302 in requests segment 304. External memory section 302 specifies, for example, type, location, and size of the physical external memory device. The physical external memory device may be, for example, physical external memory device 232 in FIG. 2. In addition, container file 300 also includes external memory location section 306 in volumes segment 308. External memory location section 306 specifies, for example, an external memory location name and corresponding type, name, and data structure of the external memory device storing the shared container data.

Figure 4:
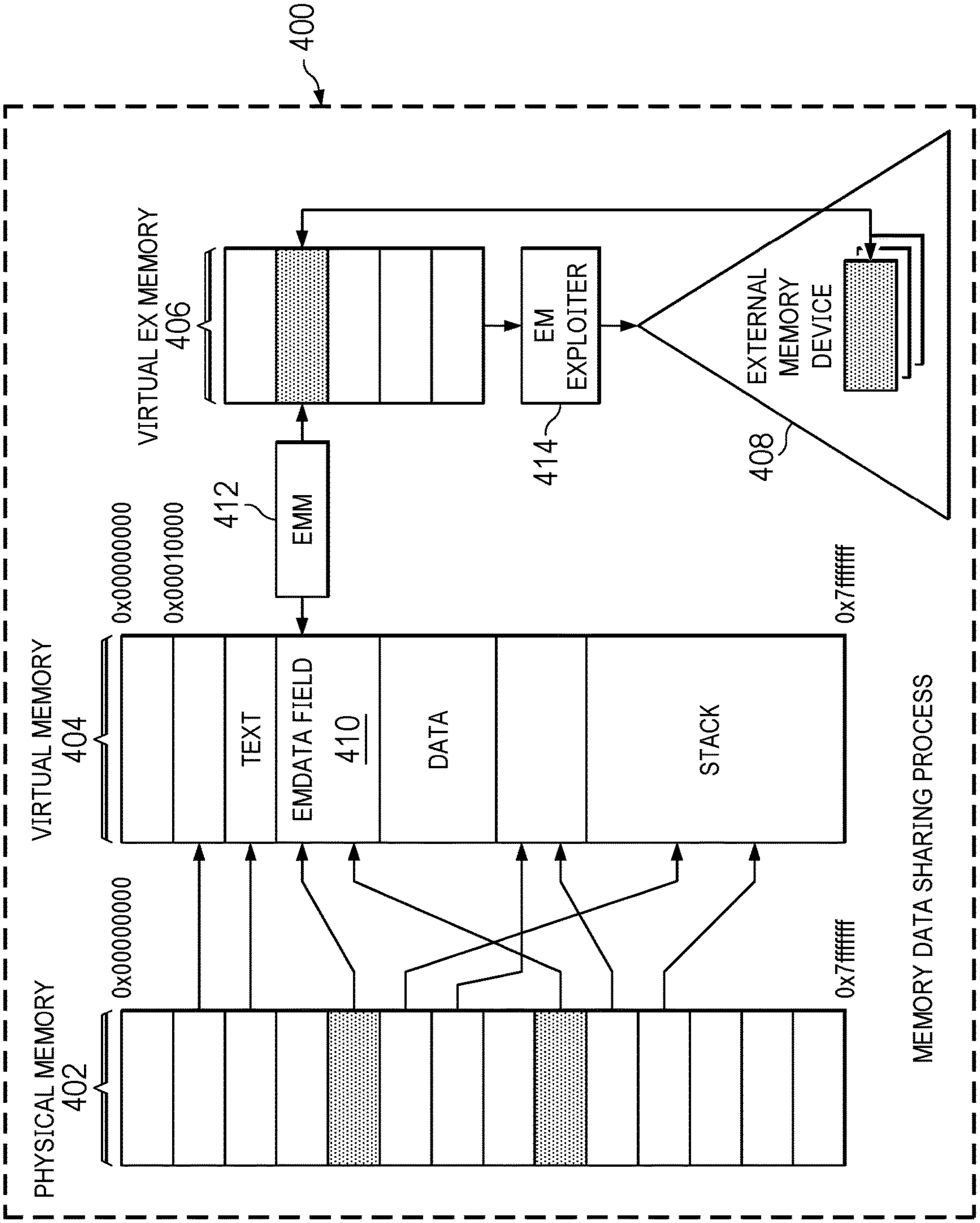
FIG. 4 is a diagram illustrating an example of a memory data sharing process in accordance with an illustrative embodiment.

With reference now to FIG. 4, a diagram illustrating an example of a memory data sharing process is depicted in accordance with an illustrative embodiment. Memory data sharing process 400 can be implemented in a container data sharing architecture, such as, for example, container data sharing architecture 201 in FIG. 2.

Memory data sharing process 400 includes physical memory 402, virtual memory 404, virtual external memory 406, and external memory device 408. Physical memory 402, virtual memory 404, virtual external memory 406, and external memory device 408 may be, for example, physical memory 242, virtual memory 228, virtual external memory 224, and physical external memory device 232 in FIG. 2.

Memory data sharing process 400 illustrates the correspondence between physical memory 402 and virtual memory 404. Virtual memory 404 includes external memory data (EMDATA) field 410, such as, for example, external memory data field 226 in FIG. 2. External memory manager 412, such as, for example, external memory manager 208 in FIG. 2, adds external memory data field 410 to virtual memory 404. External memory manager 412 stores the data that the service application wants to share between containers (i.e., partitions corresponding to the containers, such as, for example, containers 216 and 218 in FIG. 2). In addition, external memory manager 412 monitors external memory data field 410 for data changes generated by the container and synchronizes the data changes in external memory data field 410 to virtual external memory 406. External memory exploiter 414, such as, for example, external memory exploiter 230 in FIG. 2, stores the data, which is to be shared between containers and cached in virtual external memory 406, in external memory device 408 using an external memory driver program, such as, for example, external memory driver 234 in FIG. 2.

Figure 5:
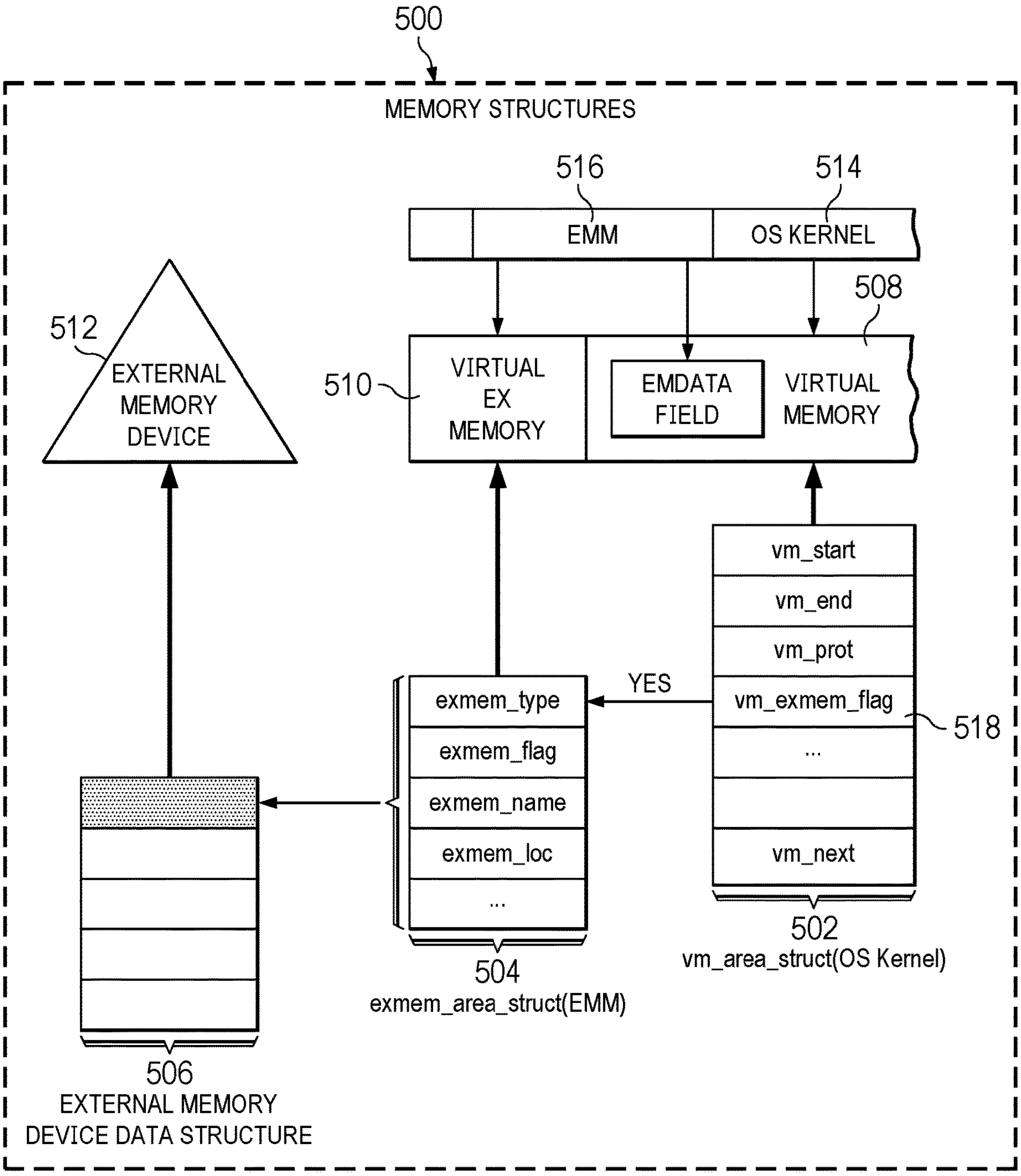
FIG. 5 is a diagram illustrating an example of memory structures in accordance with an illustrative embodiment.

With reference now to FIG. 5, a diagram illustrating an example of memory structures is depicted in accordance with an illustrative embodiment. Memory structures 500 include virtual memory area structure (VM_AREA_STRUC) 502, virtual external memory area structure (EXMEM_AREA_STRUC) 504, and external memory device data structure 506. Virtual memory area structure 502, virtual external memory area structure 504, and external memory device data structure 506 are implemented in virtual memory 508, virtual external memory 510, and external memory device 512, respectively. Virtual memory 508, virtual external memory 510, and external memory device 512 may be, for example, virtual memory 404, virtual external memory 406, and external memory device 408 in FIG. 4.

Operating system kernel 514 generates virtual memory area structure 502 of virtual memory 508. It should be noted that in this example VM_EXMEM_FLAG 518 is set to YES. Because VM_EXMEM_FLAG 518 is set to YES, external memory manager 516 generates virtual external memory area structure 504 of virtual external memory 510. Virtual external memory area structure 504 includes information regarding the location of external memory device data structure 506 in external memory device 512 for storing data to be shared between containers.

Figure 6:
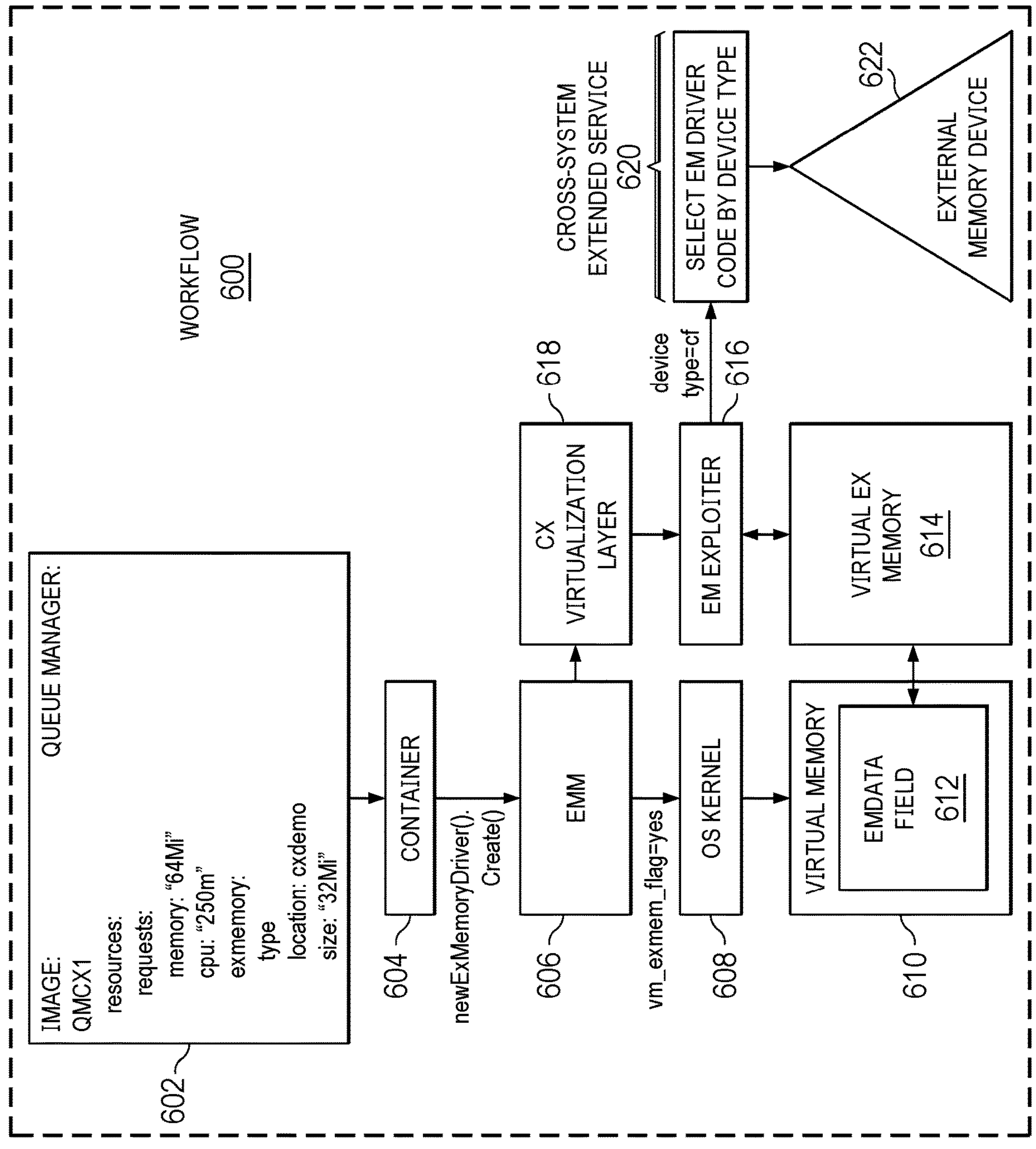
FIG. 6 is a diagram illustrating an example of a workflow in accordance with an illustrative embodiment.

With reference now to FIG. 6, a diagram illustrating an example of a workflow is depicted in accordance with an illustrative embodiment. Workflow 600 can be implemented in a container data sharing architecture, such as, for example, container data sharing architecture 201 in FIG. 2. Workflow 600 includes container file 602, container 604, external memory manager 606, operating system kernel 608, virtual memory 610, external memory data field 612, virtual external memory 614, external memory exploiter 616, container extensions virtualization layer 618, cross-system extended service 620, and physical external memory device 622.

Container file 602 may be, for example, container file 300 in FIG. 3. Container file 602 specifies, for example, the external memory device type and memory space size. Container 604 utilizes container file 602 to call a plugin container external memory API to trigger external memory manager 606 to perform a set of actions. The set of actions can include, for example, external memory manager 606 setting a virtual memory flag to yes, generating external memory data field 612 in virtual memory 610 that was generated by operating system kernel 608, informing container extensions virtualization layer 618 of the data to be shared, which is stored in a data structure of physical external memory device 622. Container extensions virtualization layer 618 virtualizes the data to be shared, which is stored in the data structure of physical external memory device 622, to virtual external memory 614 for container data sharing as requested by the upper-layer service application. The set of actions can also include external memory manager 606 instructing external memory exploiter 616 to generate a new external memory driver in cross-system extended service 620 corresponding to the service request being processed by container 604.

External memory exploiter 616 connects to physical external memory device 622 via cross-system extended service 620 using the external memory driver, such as, for example, external memory driver 234 in FIG. 2. When connecting to physical external memory device 622, the external memory driver of cross-system extended service 620 selects the corresponding code paragraph in the external memory driver's library according to the type (e.g., coupling facility) of physical external memory device 622 and connects to physical external memory device 622 to obtain the data to be shared, which is stored in the data structure of physical external memory device 622.

Figure 7:
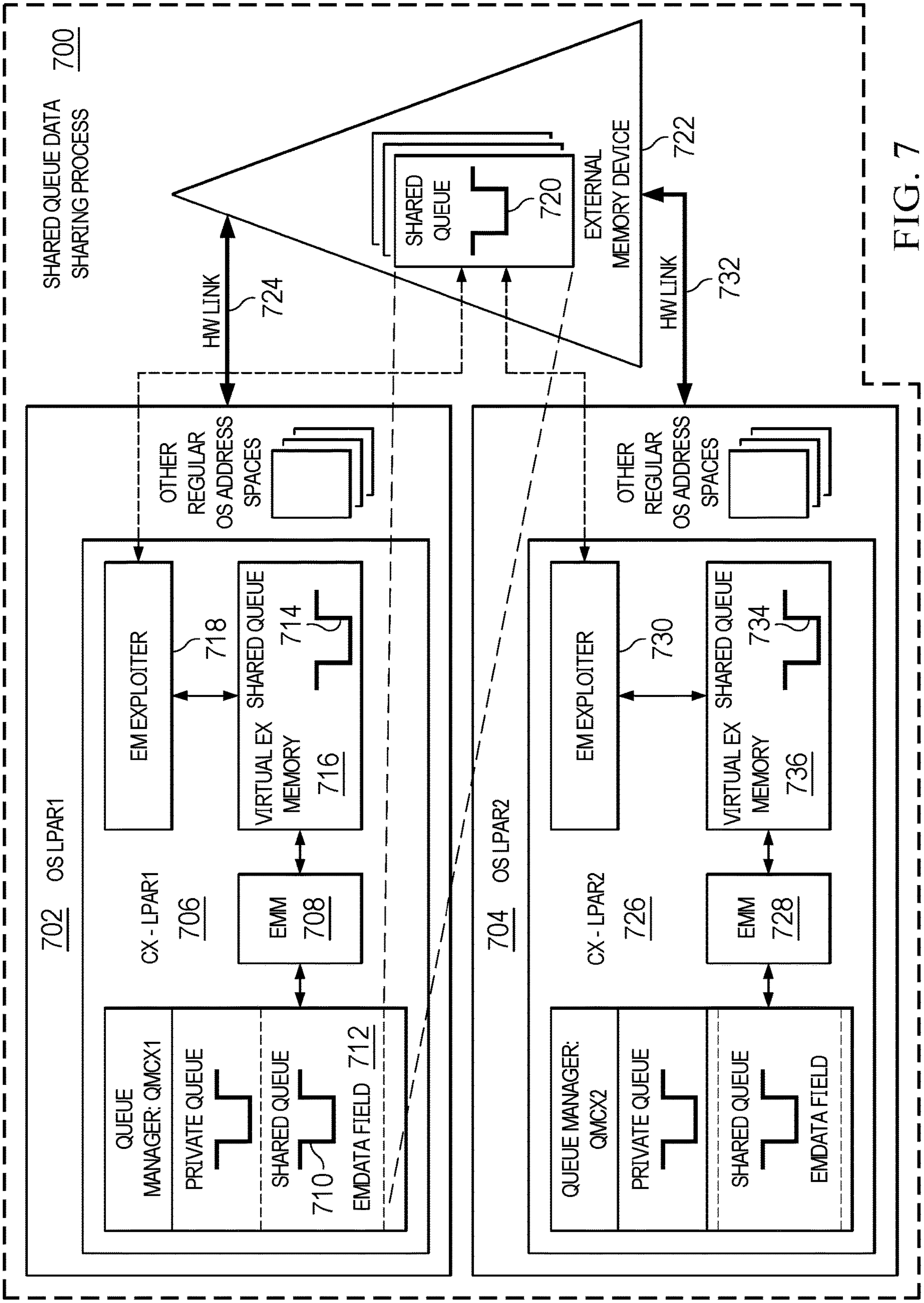
FIG. 7 is a diagram illustrating an example of a shared queue data sharing process in accordance with an illustrative embodiment.

With reference now to FIG. 7, a diagram illustrating an example of a shared queue data sharing process is depicted in accordance with an illustrative embodiment. Shared queue data sharing process 700 can be implemented in a container data sharing architecture, such as, for example, container data sharing architecture 201 in FIG. 2.

In this example, shared queue data sharing process 700 includes operating system LPAR 1 702 and operating system LPAR 2 704. However, it should be noted that shared queue data sharing process 700 is intended as an example only and not as a limitation on illustrative embodiments. In other words, shared queue data sharing process 700 can include any number of operating system LPARs.

Operating system LPAR 1 702 includes container extensions LPAR 1 706. Container extensions LPAR 1 706 is included in a container extensions virtual container server address space, such as, for example, container extensions virtual container server address space 204 in FIG. 2. Further, container extensions LPAR 1 706 corresponds to a container, such as, for example, container 216 in FIG. 2, for sharing data generated by the container while processing a service request. External memory manager 708 stores the data generated by the container while processing the service request in shared data queue 710 of external memory data field 712. In addition, external memory manager 708 copies the data contained in shared data queue 710 of external memory data field 712 to shared data queue 714 of virtual external memory 716. Further, external memory manager 708 directs external memory exploiter 718 to send the data generated by the container while processing the service request contained in shared data queue 714 of virtual external memory 716 to shared queue 720 of physical external memory device 722 via dedicated hardware link 724 for container data sharing.

Operating system LPAR 2 704 includes container extensions LPAR 2 726. Container extensions LPAR 2 726 also is included in the container extensions virtual container server address space and corresponds to another container, such as, for example, container 218 in FIG. 2. In the event that the container corresponding to container extensions LPAR 1 706 fails, external memory manager 728 directs external memory exploiter 730 to retrieve the data generated by the failed container while processing the service request from shared queue 720 of physical external memory device 722 to continue processing the service request of the failed container for high-speed container failure recovery. External memory exploiter 730 retrieves the data via dedicated hardware link 732 and places the retrieved data from shared queue 720 of physical external memory device 722 in shared data queue 734 of virtual external memory 736 for processing the service request by the container taking over for the failed container.

Figure 8:
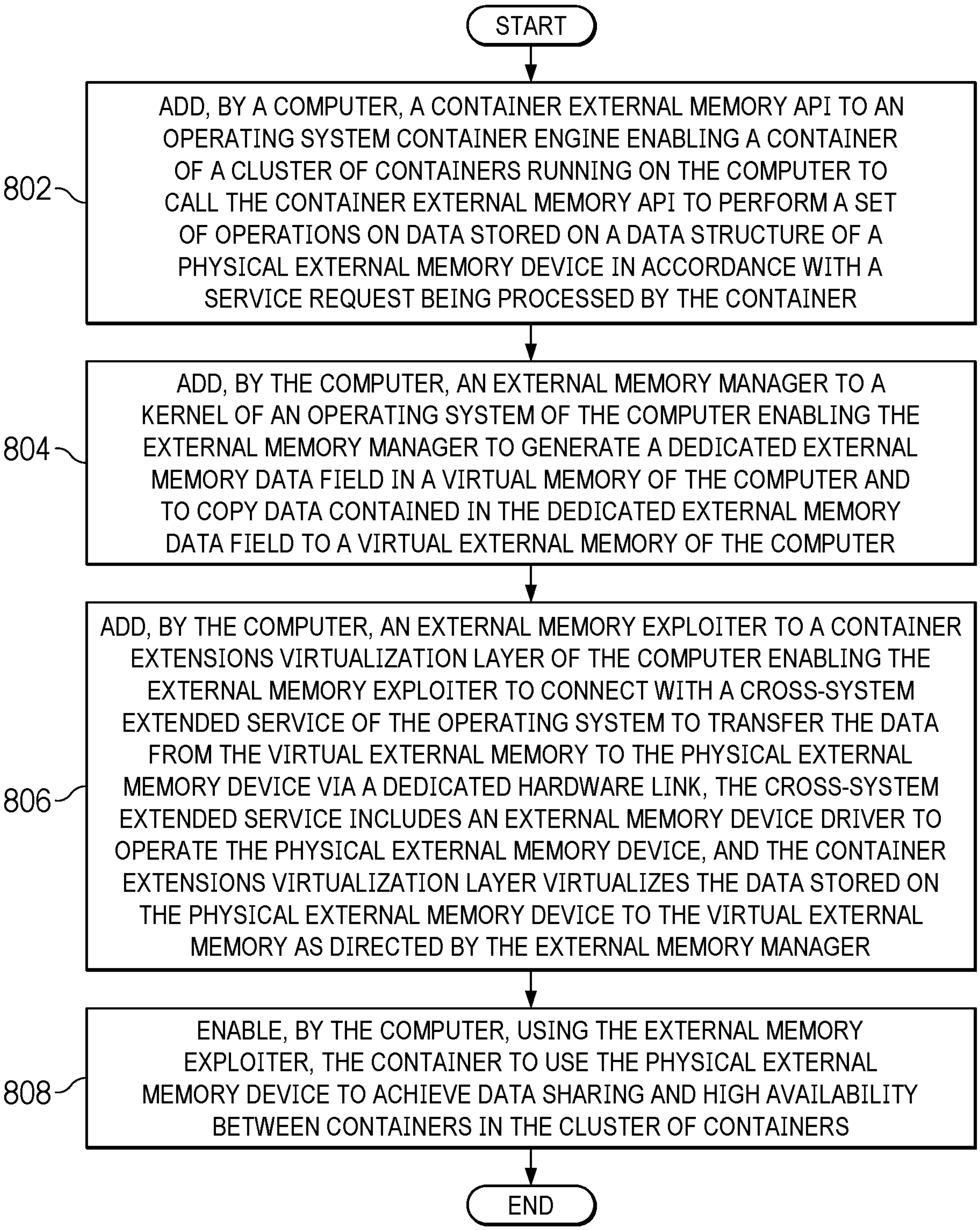
FIG. 8 is a flowchart illustrating a process for enabling container data sharing in accordance with an illustrative embodiment.

With reference now to FIG. 8, a flowchart illustrating a process for enabling container data sharing is shown in accordance with an illustrative embodiment. The process shown in FIG. 8 may be implemented in a computer, such as, for example, computer 101 in FIG. 1. For example, the process shown in FIG. 8 may be implemented in container data sharing code 200 in FIG. 1.

The process begins when the computer adds a container external memory API to an operating system container engine enabling a container of a cluster of containers running on the computer to call the container external memory API to perform a set of operations on data stored on a data structure of a physical external memory device in accordance with a service request being processed by the container (step 802). In addition, the computer adds an external memory manager to a kernel of an operating system of the computer enabling the external memory manager to generate a dedicated external memory data field in a virtual memory of the computer and to copy data contained in the dedicated external memory data field to a virtual external memory of the computer (step 804).

Further, the computer adds an external memory exploiter under a container extensions virtualization layer of the computer enabling the external memory exploiter to connect with a cross-system extended service of the operating system to transfer the data from the virtual external memory to the physical external memory device via a dedicated hardware link (step 806). The cross-system extended service includes an external memory device driver to operate the physical external memory device. The container extensions virtualization layer virtualizes the data stored on the physical external memory device to the virtual external memory as directed by the external memory manager. Furthermore, the computer, using the external memory exploiter, enables the container to use the physical external memory device to achieve data sharing and high availability between containers in the cluster of containers (step 808). Thereafter, the process terminates.

Figure 9:
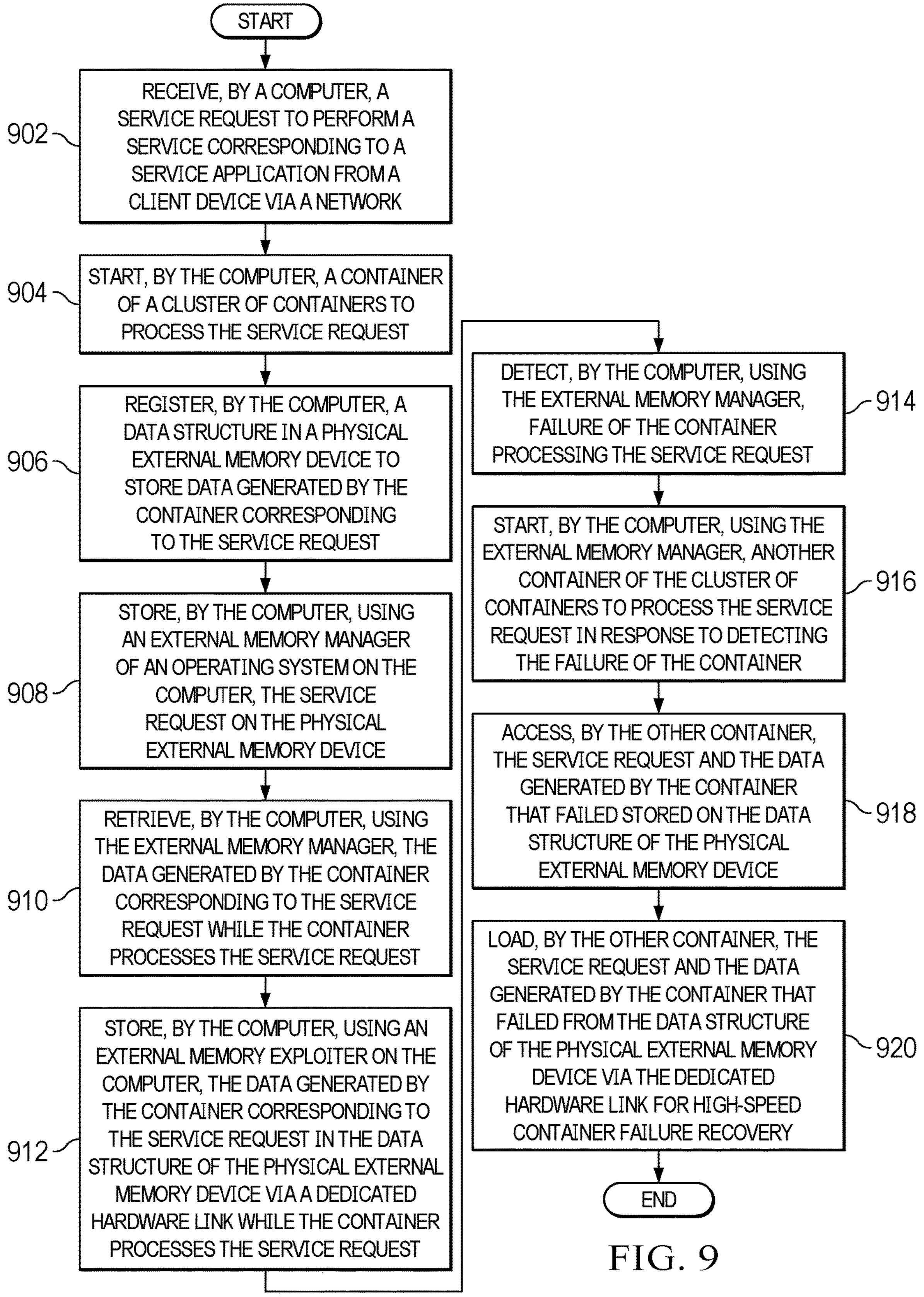
FIG. 9 is a flowchart illustrating a process for high-speed container failure recovery using a physical external memory device in accordance with an illustrative embodiment.

With reference now to FIG. 9, a flowchart illustrating a process for high-speed container failure recovery using a physical external memory device is shown in accordance with an illustrative embodiment. The process shown in FIG. 9 may be implemented in a computer, such as, for example, computer 101 in FIG. 1 or a set of computers. For example, the process shown in FIG. 9 may be implemented in container data sharing code 200 in FIG. 1.

The process begins when the computer receives a service request to perform a service corresponding to a service application from a client device via a network (step 902). In response to receiving the service request, the computer starts a container of a cluster of containers on the computer to process the service request (step 904). In addition, the computer registers a data structure in a physical external memory device to store data generated by the container corresponding to the service request (step 906). Further, the computer, using an external memory manager of an operating system on the computer, stores the service request on the physical external memory device (step 908).

The computer, using the external memory manager, retrieves the data generated by the container corresponding to the service request while the container processes the service request (step 910). The computer, using an external memory exploiter on the computer, stores the data generated by the container corresponding to the service request in the data structure of the physical external memory device via a dedicated hardware link while the container processes the service request (step 912).

The computer, using the external memory manager, detects failure of the container processing the service request (step 914). The computer, using the external memory manager, starts another container of the cluster of containers to process the service request in response to detecting the failure of the container (step 916). It should be noted that the other container can be located on a different computer or on the same computer as the failed container.

Furthermore, the other container accesses the service request and the data generated by the container that failed stored on the data structure of the physical external memory device (step 918). The other container loads the service request and the data generated by the container that failed from the data structure of the physical external memory device via the dedicated hardware link for high-speed container failure recovery (step 920). Thereafter, the process terminates.

Thus, illustrative embodiments of the present invention provide a computer-implemented method, computer system, and computer program product for enabling containers running on operating systems having container extensions to utilize physical external memory devices for container data sharing and high-speed container failure recovery via dedicated hardware links. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for container data sharing, the computer-implemented method comprising:
storing a service request on a physical external memory device;
retrieving data generated by a first container corresponding to the service request while the first container processes the service request;
starting a second container of a cluster of containers to process the service request in response to detecting a failure of the first container processing the service request;
accessing the service request and the data generated by the first container that failed stored on the physical external memory device, wherein the data includes data changes generated by the first container during partial completion of the service request by the first container;
loading the service request and the data generated by the first container that failed on the second container from the physical external memory device via a dedicated hardware link for high-speed container failure recovery; and
processing the service request by the second container from a point where the first container failed.

2. The computer-implemented method of claim 1 further comprising:
receiving the service request to perform a service corresponding to a service application from a client device via a network;
starting the first container of the cluster of containers to process the service request; and
registering a data structure in the physical external memory device to store the data generated by the first container.

3. The computer-implemented method of claim 1 further comprising:
storing the data generated by the first container in the physical external memory device via the dedicated hardware link while the first container processes the service request.

4. The computer-implemented method of claim 1 further comprising:
adding a container external memory application programming interface (API) to an operating system container engine enabling the first container of the cluster of containers to call the container external memory API to perform a set of operations on the data stored on the physical external memory device in accordance with the service request being processed by the first container;
adding an external memory manager to a kernel of an operating system enabling the external memory manager to generate a dedicated external memory data field in a virtual memory and to copy the data contained in the dedicated external memory data field to a virtual external memory; and
adding an external memory exploiter under a container extensions virtualization layer enabling the external memory exploiter to connect with a cross-system extended service of the operating system to transfer the data from the virtual external memory to the physical external memory device via the dedicated hardware link.

5. The computer-implemented method of claim 4, wherein the cross-system extended service includes an external memory device driver to operate the physical external memory device.

6. The computer-implemented method of claim 4, wherein the container extensions virtualization layer virtualizes the data stored on the physical external memory device to the virtual external memory as directed by the external memory manager.

7. The computer-implemented method of claim 4 further comprising:
enabling the first container to use the physical external memory device to achieve data sharing with the second container in the cluster of containers using the external memory exploiter.

8. A computer system for container data sharing, the computer system comprising:
a communication fabric;
a storage device connected to the communication fabric, wherein the storage device stores program instructions; and
a set of processors connected to the communication fabric, wherein the set of processors executes the program instructions to:
store a service request on a physical external memory device;
retrieve data generated by a first container corresponding to the service request while the first container processes the service request;
start a second container of a cluster of containers to process service request in response to detecting a failure of the first container processing the service request;
access the service request and the data generated by the first container that failed stored on the physical external memory device, wherein the data includes data changes generated by the first container during partial completion of the service request by the first container;
load the service request and the data generated by the first container that failed on the second container from the physical external memory device via a dedicated hardware link for high-speed container failure recovery; and
process the service request by the second container from a point where the first container failed.

9. The computer system of claim 8, wherein the set of processors further executes the program instructions to:
receive the service request to perform a service corresponding to a service application from a client device via a network;
start the first container of the cluster of containers to process the service request; and
register a data structure in the physical external memory device to store the data generated by the first container.

10. The computer system of claim 8, wherein the set of processors further executes the program instructions to:
store the data generated by the first container in the physical external memory device via the dedicated hardware link while the first container processes the service request.

11. The computer system of claim 8, wherein the set of processors further executes the program instructions to:
add a container external memory application programming interface (API) to an operating system container engine enabling the first container of the cluster of containers running on the computer system to call the container external memory API to perform a set of operations on the data stored on the physical external memory device in accordance with the service request being processed by the first container;

add an external memory manager to a kernel of an operating system of the computer system enabling the external memory manager to generate a dedicated external memory data field in a virtual memory of the computer system and to copy the data contained in the dedicated external memory data field to a virtual external memory of the computer system; and add an external memory exploiter under a container extensions virtualization layer of the computer system enabling the external memory exploiter to connect with a cross-system extended service of the operating system to transfer the data from the virtual external memory to the physical external memory device via the dedicated hardware link.

12. A computer program product for container data sharing, the computer program product comprising a computer-readable storage medium having program instructions embodied therewith, the program instructions executable by a set of processors to cause the set of processors to perform a method of:

storing a service request on a physical external memory device;

retrieving data generated by a first container corresponding to the service request while the first container processes the service request;

starting a second container of a cluster of containers to process service request in response to detecting a failure of the first container processing the service request;

accessing the service request and the data generated by the first container that failed stored on the physical external memory device, wherein the data includes data changes generated by the first container during partial completion of the service request by the first container;

loading the service request and the data generated by the first container that failed on the second container from the physical external memory device via a dedicated hardware link for high-speed container failure recovery; and processing the service request by the second container from a point where the first container failed.

13. The computer program product of claim 12 further comprising:

receiving the service request to perform a service corresponding to a service application from a client device via a network;

starting the first container of the cluster of containers to process the service request; and registering a data structure in the physical external memory device to store the data generated by the first container.

14. The computer program product of claim 12 further comprising:

storing the data generated by the first container in the physical external memory device via the dedicated hardware link while the first container processes the service request.

15. The computer program product of claim 12 further comprising:

adding a container external memory application programming interface (API) to an operating system container engine enabling the first container of the cluster of containers to call the container external memory API to perform a set of operations on the data stored on the physical external memory device in accordance with the service request being processed by the first container;

adding an external memory manager to a kernel of an operating system enabling the external memory manager to generate a dedicated external memory data field in a virtual memory and to copy the data contained in the dedicated external memory data field to a virtual external memory; and adding an external memory exploiter under a container extensions virtualization layer enabling the external memory exploiter to connect with a cross-system extended service of the operating system to transfer the data from the virtual external memory to the physical external memory device via the dedicated hardware link.

16. The computer program product of claim 15, wherein the cross-system extended service includes an external memory device driver to operate the physical external memory device.

17. The computer program product of claim 15, wherein the container extensions virtualization layer virtualizes the data stored on the physical external memory device to the virtual external memory as directed by the external memory manager.

* * * * *